United States Patent [19]
Mann et al.

[11] Patent Number: 5,216,592
[45] Date of Patent: Jun. 1, 1993

[54] SYSTEM AND METHOD FOR BUSINESS PROCESS AUTOMATION

[75] Inventors: George R. Mann, Port Ewen; Colette A. Vanderbeck, Saugerties, both of N.Y.

[73] Assignee: International Business Machines Corporation, Armonk, N.Y.

[21] Appl. No.: 691,279

[22] Filed: Apr. 25, 1991

[51] Int. Cl.⁵ .................. G06F 15/22; G06F 15/24
[52] U.S. Cl. ...................... 364/401; 395/922
[58] Field of Search ................. 364/401; 395/922

[56] References Cited

U.S. PATENT DOCUMENTS

| | | | |
|---|---|---|---|
| 4,831,525 | 5/1989 | Saito et al. | 364/300 |
| 4,831,580 | 5/1989 | Yamada | 364/900 |
| 4,916,637 | 4/1990 | Allen et al. | 364/513 |
| 5,038,296 | 8/1991 | Sano | 364/513 |
| 5,084,813 | 1/1992 | Ono | 395/1 |
| 5,109,337 | 4/1992 | Ferriter et al. | 364/401 |

Primary Examiner—Roy N. Envall Jr.
Assistant Examiner—Ari M. Bai
Attorney, Agent, or Firm—Mark S. Walker; William A. Kinnaman, Jr.

[57] ABSTRACT

A system and method for developing specialized data processing systems for tracking items through a business process. The method allows rapid creation of a specific data processing system based upon a series of generic process rules previously developed and stored in the system. Process activity definitions, activity paths transitions, data access, and operator interaction panels are defined. Based upon the user supplied inputs and generic rules, a complete data processing system is generated. In operation, the generated system operates using a process flow controller to manage the processing steps. Each item being tracked through the system has an associated item status. The controller is conditionally responsive to item state and item data content when determining the activities are available for selection and the processes and their authorized operators. The present invention implements state sensitive process automation in that the tasks are assigned and processed only when such assignment is indicated by the current item state and associated data content.

11 Claims, 4 Drawing Sheets

SYSTEM AND METHOD FOR BUSINESS PROCESS AUTOMATION

BACKGROUND OF THE INVENTION

1. Field of the Invention

The present invention relates to data processing systems, and in particular to data processing system structures and methods of operation for generating or creating a data processing application automating information management and supporting a business process.

2. Background of the Invention

Businesses must acquire and manage large amounts of information for decision making, planning, and operating the business. Each enterprise implements business processes for collecting and managing the information required for that particular enterprise. These business processes typically specify the individuals responsible for generating information, for reviewing and approving the information, and for accessing and using the information for specified purposes.

Data processing systems provide facilities to organize and manage large amounts of information. Unfortunately, these data processing systems must be programmed to implement the business process of a particular enterprise. Programming such a system requires the efforts of talented programmers over a relatively long period of time. This type of implementation is both costly, and potentially error prone. In addition, many enterprises have application development backlogs of several years.

Software products such as application generators have been developed in response to the need for more rapidly developed software applications. Related technical areas include computer aided software engineering (CASE), and fourth generation language (4GL). The terms are frequently used interchangeably. Examples of application generators are the IBM Cross System Product Generator, the Oxford Software Corporation User Files On-Line (UFO), and the Cullinet AD-S/On-Line product.

Existing application generators typically provide an application designer with the ability to access a database for review and update according to predefined options. The application designer defines input and output options which allow the data to be accessed, reviewed, updated and returned to the data file. The definition of accesses permitted and the persons authorized to access the data is completed at the time of system specification and is static. That is, the generators provide no means of dynamically changing accesses required or authorizations permitted as the system operates. Similarly, the processing flow of the application remains static and generally does not change based upon data content.

SUMMARY OF THE INVENTION

The static specification of access, authorization and processing has limited the use of application generators for certain business processes. In particular, generator use for tracking applications is limited due to the need for dynamic changes to authorization and processing logic.

The technical problem existing in the prior art is the lack of systems and procedures for quickly creating an automated tracking system able to respond to changes in item state and to item data content.

The present invention is directed to providing an application generator for tracking applications that is able to create a tracking environment based on non-procedural input data. The present invention extends application generator technology by adding systems and methods for creating dynamic, process and state based automation environments. Tracking applications are those which coordinate the collection and refinement of information needed to process a set of similar items. Items may include orders, maintenance requests, problem reports, or similar entities. A tracking application supports communication between participants to facilitate effective processing by each participant based upon their individual responsibilities.

The present invention dynamically assigns tasks based on the item state and associated data. The assignment process notifies participants of actions that they must take to complete processing of the item. Finally, the present invention tracks actions taken by a particular participant and maintains item status information.

DETAILED DESCRIPTION OF THE PREFERRED EMBODIMENT

The present invention is directed to automatically creating or generating a data processing system for tracking items through a business process. The data processing system is developed for a specific application based upon a series of non-procedural language inputs provided by an application designer. These inputs are processed according to rules specified in generic process descriptors and cause the system of the present invention to generate an application environment for tracking items according to the specified inputs. The completed application is expressed in terms of processing code, input and output screens and reports, and data file or database specifications.

Figure 1:
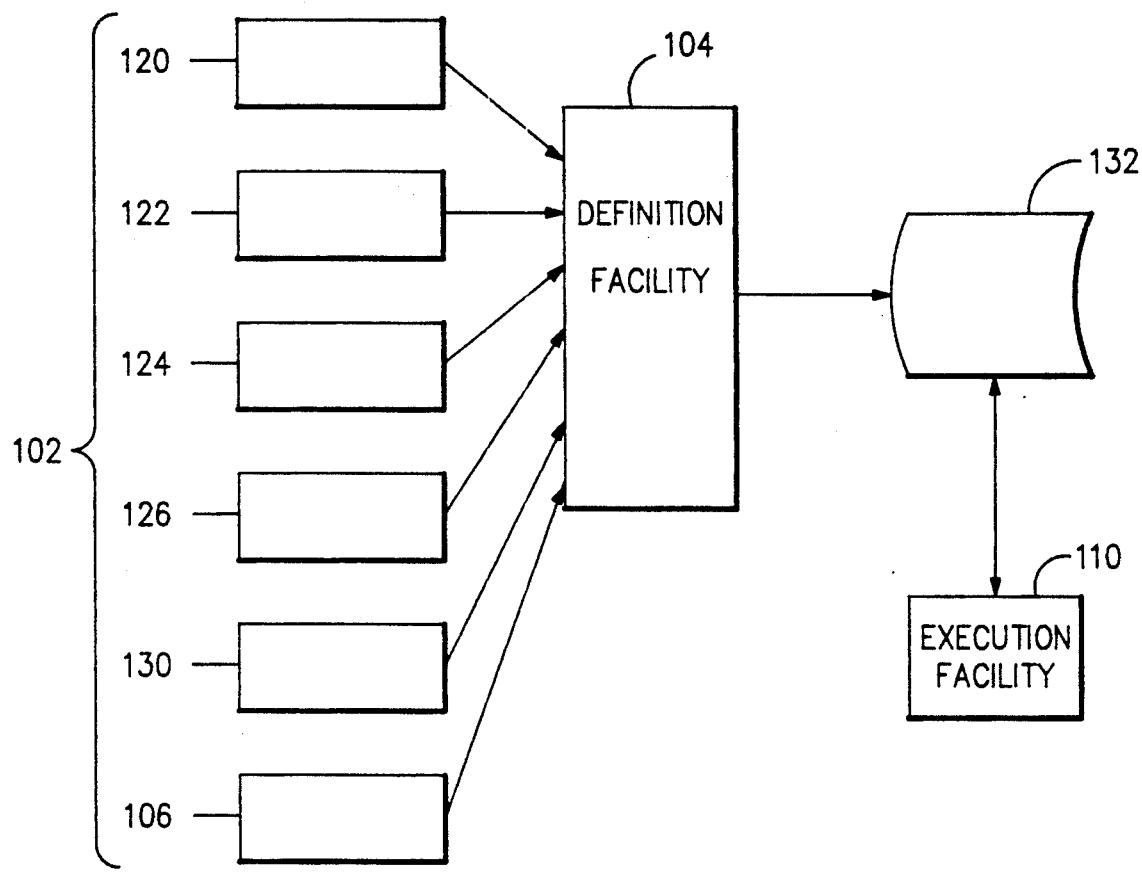
FIG. 1 is a block diagram showing the components and interrelationships of a system according to the present invention.

A data processing system generator according to the present invention operates generally as shown in FIG. 1. Non-procedural inputs shown generally at 102 are accepted by a definition facility 104. User written procedures 106 are developed for inclusion by the generator. The definition facility kernel 104 and execution facility kernel 110 contain generic tracking system processing rules used to control the final application system environment operation. The definition facility kernel 104 combines the non-procedural inputs 102 and procedural inputs 106 to create the necessary programs, screens, databases or data files for the running application 132.

Non-procedural inputs 102 consist of non-procedural definitions of system properties. The three main sets of definitions are data definitions 120, process definitions 122 and interface definitions 124. In addition, when an application is to be supported on a network, multisite configuration 126 is required. For each application, participant profiles 130 are supplied describing end user functions. Definition facility 104 combines these into the completed application environment shown generally as 132. The completed application environment consists of a plurality of tables accessed by execution facility 110. These tables correspond to the non-procedural input and include data definitions, process definitions, interface definitions, and profiles. Running application 132 also contains data files or databases necessary to track items.

Data accessing and processing for a particular item is conditioned upon the state of that item and associated data values. The state of the item can be, for example, whether the item is a new item in the system, whether it has been processed in some way, whether an approval has been given, and so forth. This dynamic assignment of tasks based upon the items state and data is referred to as "state sensitive" task assignment.

A series of input and output user interaction panels 124 are defined for the system. One or more panels are defined for each state of an item and if more than one panel, the logic for moving between panels is specified. The panels define input and output structure and the data structure of information associated with the item. Database or file access is determined based upon the data definitions 120 supplied with the panel.

Process definitions 122 are supplied in the form of activity definitions and path definitions connecting those activities. Each task or activity that may be performed by the system is defined. Assignment of the activity for processing depends upon the current item state and associated data. Activities, in the preferred embodiment, can be of four main types. Additional activities could be defined and implemented in a system according to the present invention. A process-driven activity is performed only when a current item state meets the process conditions for performance of that activity. A free activity can be performed at any time by a person authorized to perform that activity. A menu activity allows selection of an item but does not access or modify data. A void activity is used to reactivate an item that has previously completed processing. Activities can have a series of dependencies, i.e., other activities which must be completed before this activity can be assigned. Dependencies are expressed in terms of the current item state. These dependencies control the authorization of people who may perform the activity and control the data access allowed. Activity definitions allow restriction of data access and processing to those persons in an organization who must have access to the data for action based upon the current item state.

Figure 2:
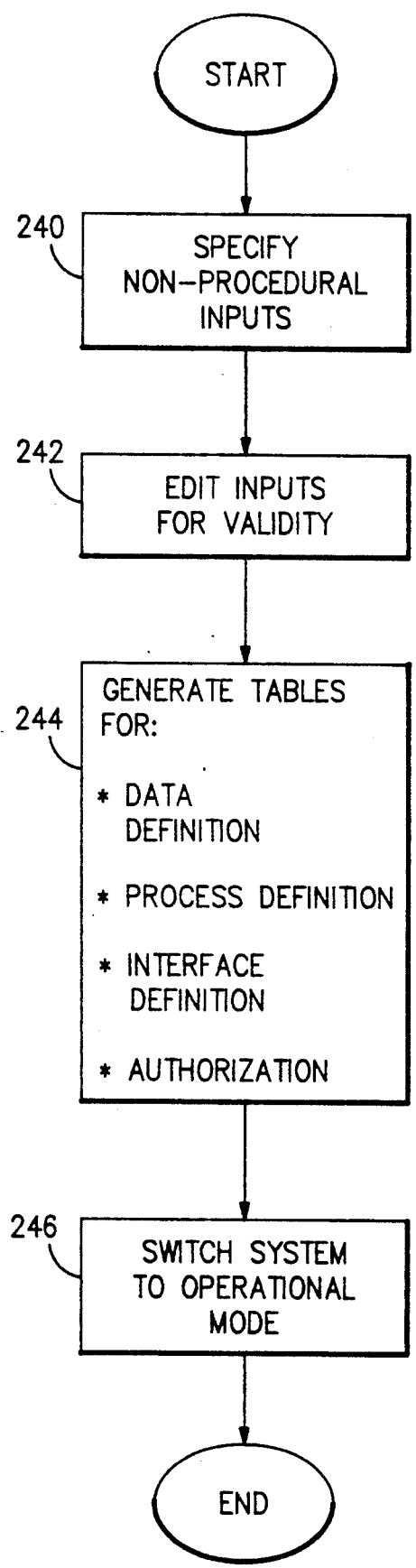
FIG. 2 is a flowchart generally illustrating the application definition processing steps according to the present invention.

The present invention creates a data processing tracking application environment. The steps of the creation process are shown generally in FIG. 2. Non-procedural data is entered by the application developer 240. Next, those inputs are validated by the system 242 to ensure compliance with system constraints and syntax. Valid data is then used to generate tables 244 according to prescribed formats. The generated tables are used by the system to control authorization, data access, user interface display and activity assignment. The system is switched to operational mode 246 when all required tables have been specified.

The data processing system application environment created by the present invention consists of a process flow controller (commonly referred to as a "shell") which controls the overall processing of the system. The process controller of the preferred embodiment is continuously enabled and is activated upon receipt of input. The preferred embodiment employs a "service machine" defined under the IBM VM/XA or VM/ESA operating system. The controller manages panel display, acceptance of responses and approvals, validation and update of data. Because the controller is always operational, it acts in real time on any action or approval entered into the system. In the preferred embodiment, user exits are provided to allow the designer to supply procedural code to process data either before, after or during entry on a data entry panel.

Figure 3:
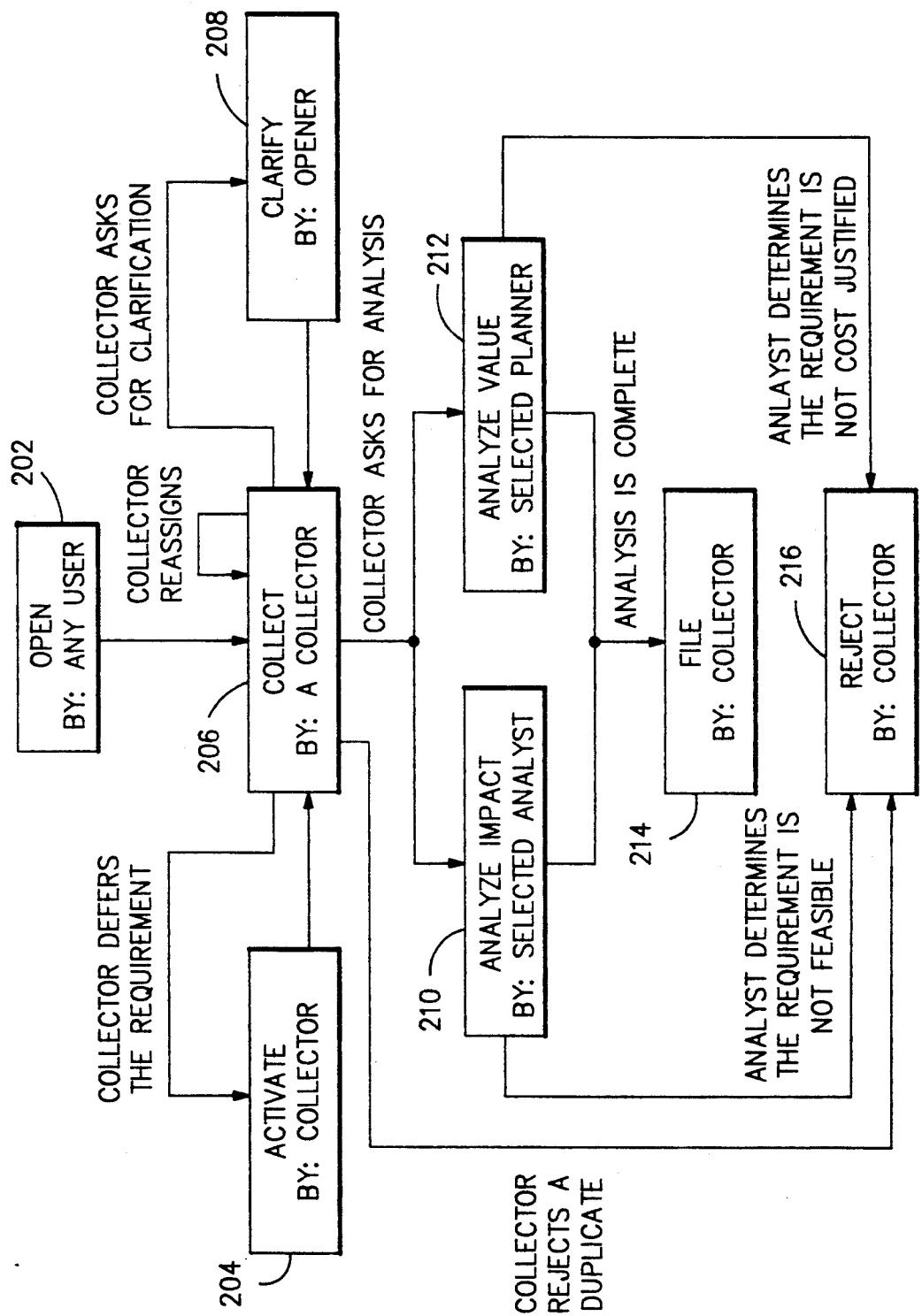
FIG. 3 is a network diagram of a requirements process implementable by the present invention.

The preferred embodiment is implemented on a multiuser service machine allowing access by one or more people responsible for the activity. A key feature of the present invention is the ability to control task assignment and activation based upon item state and associated data. The overall flow of data in the system according to the present invention is shown in FIG. 3. The controller manages processing by referencing and updating the tables generated by the definition facility. The process tables define conditions for transitions between item states and data access authorization based upon item condition. A state table maintains the current state of each item. This maintenance of state information allows the implementation of state sensitive process automation.

Figure 4:
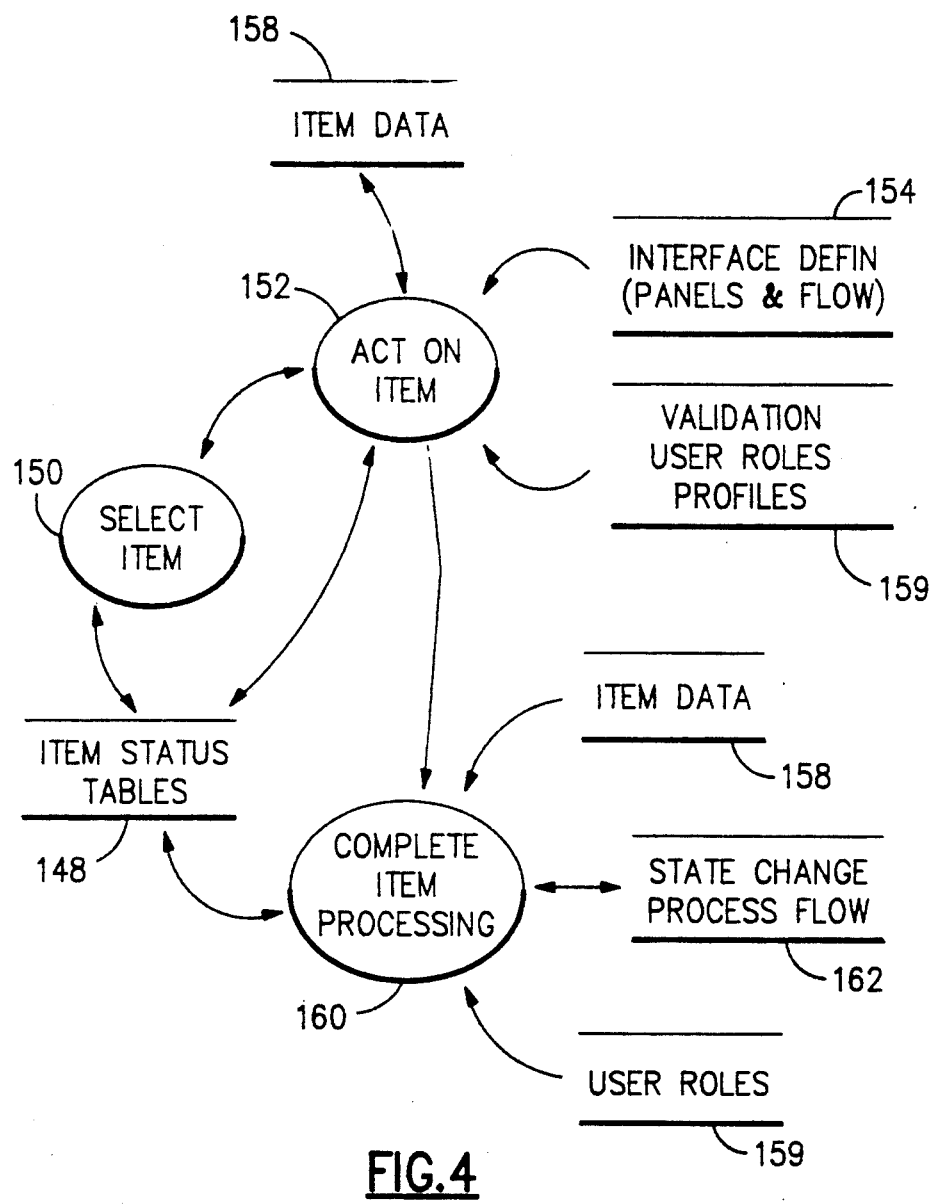
FIG. 4 is a flow diagram illustrating the major processes and information flows of a system according to the present invention.

FIG. 4 is a flow diagram showing the processing and flow of control between basic system tasks. In FIG. 4 the user has the ability to select an item for processing 150 based upon a list of items and activities assigned to that user as extracted from the activity table. The item status tables 148 maintain, among other things, the state of each item in the system. Once the user selects an item, that item is processed 152 through the review and entry of data on one or more interface panels 154. Processing is limited to those persons authorized in item status tables 148. Authorization to access or process an item varies dynamically based upon item state and associated data. The item status table also controls the data which may be accessed from the data file or database 158. Actions and data entered by the end user are validated by reference to validation table 159 that contains a definition of user roles. Once the user signals completion of an activity, the system evaluates 160 whether that activity meets all completion criteria. Among the information checked is state change table 162 that indicates whether prerequisite activities must be checked for completion and whether multiple concurrent or parallel activity steps have been completed. If all necessary tasks have not been completed, the current activity is not completed. If the activity is to be completed, a notification table within validation table 159 is accessed and used to send notifications to the appropriate persons. Upon completion, activity table 148 is updated with the latest item state.

The above series of steps controls the process flow. The process controller manages the order in which steps are performed by limiting the display of selected activities to those which can be activated from their current state.

FIG. 3 is an example of a process that may be implemented by the present invention. The present invention is capable of implementing any network process diagram. The network allows parallel activities, activities requiring concurrent processing by multiple users, and loops back to the same activity. Standalone activities that are not part of the network may also be specified and performed. For example, in FIG. 3 activities are shown as boxes. An initial activity 202 allows opening of a requirement. After activity 206 completes with indication that "collector asks for analysis", activities 210 and 212 can each proceed in parallel. When the analysis is complete for both steps, activity 214 files the final requirement. At each activity processing step, multiple paths are defined which lead to other actions. For example, in step 212, analyze value, a determination may be made that the requirement is not cost justified, leading to a rejection step 216. State change process flow 162 controls situations where multiple parallel activities are required to be completed before processing of a subsequent activity. In the example, if step 212 leads to a rejection, then activity 214 will never be performed. Additional effort should also not be devoted to step 210 "analyze impact" because the lack of cost justification is sufficient to reject the requirement. The synchronization process causes activity 210 to be disabled and notification sent to those assigned to that activity to cease work.

The system according to the present invention operates based on a set of behaviors defined for tracking applications. The behavior of an organization defines the communication patterns, notifications, and authorizations expected during the performance of certain activities. A generalized set of rules are incorporated in the process controller with the generated tables providing data to customize the processing. The patterns for a particular organization or particular set of systems is defined and included in the generated system by the process of data input and table generation described above. For example, in tracking systems, the completion of an activity leads to a status update, conditional notification of certain individuals such as responsible persons, persons involved in the next activity, and persons monitoring status, and a dynamic transfer responsibilities depending on item state and associated data. Since these common behaviors can be prespecified, the designer need only provide specific behavior instances necessary to create the completed system for the particular organization.

The present invention has been described in terms of the implementation of the preferred embodiment. It will be understood by those in the field that alternate implementations of these ideas can be made. The description herein is not intended to limit in any way the scope of the invention. The invention is to be limited only by the appended claims.

We claim:

1. A method for creating an independent data processing system for tracking items through a business process, said system being implemented in a computer system having a processor, storage, and operator interaction means, the method comprising the steps of:
    storing a plurality of generic process rules in said storage, said process rules specifying conditions for dynamically controlling process activation;
    storing data for a business process instance in said storage means according to a plurality of data definitions describing data format,
    storing a plurality of process activity definitions in said storage, said definitions specifying process authorizations and completion requirements for said business process instance;
    storing path definitions, each of said path definitions specifying conditions for transition between one of said process activities and a second of said process activities;
    storing one or more operator interaction panels for each of said activities; and
    generating said tracking application data processing system based on said generic process rules, said data, said process activity definitions, said path definitions and said operator interaction panels.

2. The method of claim 1 wherein said process activity definitions and said path definitions define a network having a plurality of processes operable in parallel, a plurality of processes having concurrent processing by multiple users, and a plurality of repetitive process loops.

3. The method of claim 2 wherein said path definitions synchronize two or more concurrently active tasks.

4. The method of claim 3 wherein said process activity definitions each specify an individual or group authorized to perform said process activity and a subset of said data that may be accessed.

5. The method of claim 1 wherein said data is comprised of a plurality of data records, each of said data records containing data associated with an item being tracked through said business process, and wherein said path definition conditions are responsive to said associated item data.

6. A state sensitive data processing system for tracking business information, said system comprising:
    storage means for storing a plurality of computer instructions and a plurality of tracking data items;
    processor means, responsive to said computer instructions, for controlling said data processing environment and for modifying said tracking data items;
    user interaction means for accepting data and presenting data to a plurality of system users;
    first process logic means for directing generic process flow sequences, said flow sequences having a plurality of computer instructions for processing by said processor means; and
    second process logic means for directing instantiation of specific flow sequences in response to said tracking data items, wherein said instantiation causes said first process logic means to issue a plurality of computer instructions to said processor means.

7. The system of claim 5 wherein said second process logic means comprises:
    process definition means for specifying each of a plurality of business process tasks; and
    path definition means for specifying conditions for transitions between ones of said plurality of business process tasks, and wherein said first process logic means evaluates said conditions and issues a selected set of computer instructions to said processor means based upon the result of said evaluation.

8. The system of claim 7 wherein said user interaction means comprises:
    a computer display device;
    a plurality of user interaction display panels; and
    processing logic for displaying and processing said user interaction display panels.

9. A computer program product having a computer readable medium having computer program logic recorded thereon for creating an independent data processing system for tracking items through a business process, said program product comprising:
    process logic means for directing generic processing steps of said business process;

means for accepting process input descriptive of specific processes in a particular business process instance;

means for storing said process input in a computer storage means;

means for storing status data indicative of a status of a tracking item;

means for storing data associated with a tracking item; and means for controlling said process logic means in response to said status data and based upon said process input.

10. The program product of claim 9 wherein said means for controlling said process logic means comprises a plurality of process descriptors describing process logic tasks, and a plurality of process path definitions specifying conditions for transition between ones of said plurality of process logic tasks, said conditions expressed in terms of said status data and said associated data.

11. The program product of claim 10 wherein said process descriptors specify an individual or group authorized to perform said process, and a set of associated data that may be accessed during said processing.

* * * * *

UNITED STATES PATENT AND TRADEMARK OFFICE
Certificate

Patent No. 5,216,592            Patented: June 1, 1993

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: George R. Mann, Port Ewen, NY; Colette A. Vanderbeck, Saugerties, NY; and Kenneth J. Hoopes, Morrisville, NC.

Signed and Sealed this Twenty-eighth Day of October 2003.

TARIQ HAFIZ
*Supervisory Patent Examiner*
Art Unit 3623